United States Patent [19]

Albertz et al.

[11] Patent Number: 4,791,817

[45] Date of Patent: Dec. 20, 1988

[54] METHOD OF DETERMINATION AND MONITORING OF FUEL MASS STREAM

[75] Inventors: Theodor Albertz, Kirchhellen; Theo Von Tolkacz; Hans R. Baumann, both of Essen, all of Fed. Rep. of Germany

[73] Assignee: Krupp-Koppers GmbH, Esseb, Fed. Rep. of Germany

[21] Appl. No.: 881,102

[22] Filed: Jul. 2, 1986

Related U.S. Application Data

[63] Continuation-in-part of Ser. No. 571,518, Jan. 17, 1984, abandoned.

[30] Foreign Application Priority Data

Jan. 21, 1983 [DE] Fed. Rep. of Germany ....... 3301936
May 5, 1983 [DE] Fed. Rep. of Germany ....... 3316368

[51] Int. Cl.$^4$ .............................................. G01F 1/74
[52] U.S. Cl. .................................................. 73/861.04
[58] Field of Search ..................... 73/195, 196, 861.04, 73/861.03

[56] References Cited

U.S. PATENT DOCUMENTS

| | | | |
|---|---|---|---|
| 2,439,723 | 4/1948 | Engdahl | 73/861.04 X |
| 4,198,860 | 4/1980 | King | 73/861.63 X |
| 4,270,558 | 6/1981 | Forster et al. | 73/861.04 X |
| 4,341,107 | 7/1982 | Blair et al. | 73/861.04 X |
| 4,483,199 | 11/1984 | Beiermann et al. | 73/861.04 |
| 4,501,156 | 2/1985 | Kretschmer et al. | 73/861.04 |

OTHER PUBLICATIONS

Raptis et al., "Ultrasonic Properties of Coal Slurries and Flow Measurement by Cross Correlation", in IEE Trans. on Sonics, vol. SU 28, No. 4, 7/81.

Primary Examiner—Herbert Goldstein
Attorney, Agent, or Firm—Michael J. Striker

[57] ABSTRACT

A method of determination and monitoring of a fuel mass stream supplied for partial oxidation of fine-grain up to pulverized fuels to a gasifier includes determining a total density $\rho_{tot}$ of a fuel stream conveyed by a fluidizing gas in an outlet conduit of a fuel bin with the aid of a radiometric density measurement, subsequently determining a total volume stream $q_{vtot}$ of said stream by a differential pressure measurement, determining a difference between volume streams of a fluidizing gas supplied to the fuel bin $q_{vgas\ supplied}$ and discharged from the latter $q_{vgas\ discharged}$ by differential pressure measurements, determining a volume stream of the fluidizing gas $q_{vgas}$ fuel in accordance with the following equation:

$$q_{vgas} = (q_{vgas\ supplied} - q_{vgas\ discharged}) - q'_{vgas},$$

determining the volume stream of the gas part $q'_{vgas}$ in accordance with the following equation:

$$q'_{vgas} = q'_{mK} \times \frac{\rho\ gas(b)}{\rho\ K}$$

wherein $\rho_K$ is the density of the fuel, $\rho_{gas\ (b)}$ is operational density of the fluidizing gas at a pressure and temperature in the fuel bin, and $q'_{mk}$ is the fuel volume stream determined by weighing in the fuel bin, introducing a density of the fluidizing gas $\rho_{gas}$ as a material-dependent constant; and finally determining from the thus obtained values the fuel mass stream $q_{mk}$ in accordance with the following equation:

$$q_{mk} = (\rho_{tot} \cdot q_{vtot}) - (\rho_{gas} \cdot q_{vgas}).$$

3 Claims, 2 Drawing Sheets

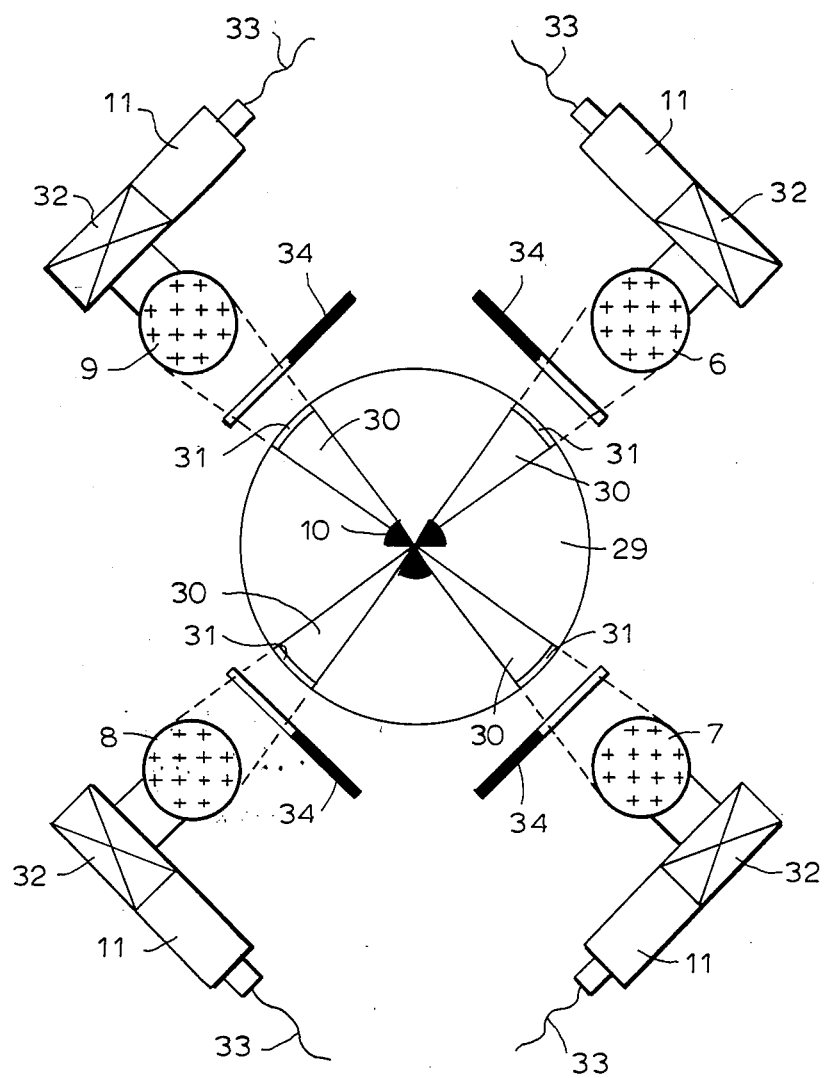
F I G. 2

METHOD OF DETERMINATION AND MONITORING OF FUEL MASS STREAM

CROSS-REFERENCE TO A RELATED APPLICATION

This application is a continuation-in-part of parent application Ser. No. 571,518 filed on Jan. 17, 1984, now abandoned.

BACKGROUND OF THE INVENTION

The present invention relates to a method of determination and monitoring of a fuel mass stream which in the case of partial oxidation (gasification) of fine-grain up to pulverized fuel is supplied to a gasifier.

More particularly, the present invention relates to such a method which uses a radiometric density measurement of a fine-grain up to pulverized fuel conveyed with a gaseous medium, and a volume stream measurement, as well as uses process computers for conducting the required calculating operations.

During the partial oxidation of solid fuels, such as for example brown or stone coals or oil coke, it is necessary to guarantee that the fine-grain up to pulverized fuel, which in some cases can be brought to the desired grain size by a preceding grinding, be supplied to the gasifier with the gaseous or vaporous reaction media in a uniformly and quantitatively exactly defined stream. This is needed to provide in the gasifier constant operational conditions which guarantee a uniform quality of the produced partial oxidation gas. As gaseous or vaporous reaction, media, it is possible to use oxygen, air, or air enriched with oxygen, as well as an additional water vapor. When the fuel part in the reaction mixture in the gasifier is too low, this results because of the thus produced high ratio of oxygen to fuel, an undesirable increase in the operational temperature in the gasifier. If, to the contrary the fuel part in the reaction mixture in the gasifier is too high, this results in an incomplete reaction of the fuel with the oxidation medium. Thus there is a possibility that the not converted fuel particles deposit in the gasifier or together with the produced gas discharge from the gasifier. Moreover, under certain circumstances, this leads to breakdown of the reactor.

Therefore, it is necessary to determine and continuously monitor the fuel mass stream supplied to the gasifier. For solving this problem, there are methods which are described in the DE-OS No. 26 42 537 and DE-OS No. 27 57 032, in accordance with which the fine-grain up to pulverized fuel conveyed with the vaporous or gaseous reaction media is detected directly before the entrance of the gasifier by a radiometric density measurement, and the thus obtained value, with consideration of further value for the volume stream of the gaseous media and the density of the used fuel, is converted with the utilization of the process computer into a mass stream signal for the fuel supply. Thereby the safety locking of the gasifier can be controlled.

The utilization of the radiometric density measurement for the above mentioned purpose is already known. In accordance with this method, the radioactive ray penetrates in a predetermined measuring section the fuel conveyed with the gaseous reaction media and is weakened in dependence upon the penetrated weight per unit area (density × penetrated length). The residual ray is measured by a radiation detector and converted into a density-proportional direct-current signal. The measuring device includes a radioactive irradiator arranged at one side of the measuring section, and a detector located opposite to the irradiator at the other side of the measuring section. Between the radioactive irradiator and detector, a portion of a pipe through which solid fuel flows is located, the portion serving as the measuring section. The above described method provides for several advantages including contactless measurement, continuous measuring possibility, and relatively high reliability. Despite these advantages, the method described in both the above-mentioned DE-OS is not completely satisfactory because of the following reasons, and therefore can be improved. In the known method, the radiometric density measurement takes place in a pipe portion which in addition to the fuel and the fluidizing gas, also has the gaseous or vaporous reaction medium. This means, however, that the loading of the gas stream with fuel can in certain conditions lower to a limiting value in which an exact radiometric density measurement is no longer possible. Moreover, in accordance with the known method, the quantity of the fluidizing gas with which the fine-grain up to pulverized fuel leaves the fuel bin is left not considered. This quantity can, however, in certain conditions make a very high part of the gas quantity required for conveying the fuel, and therefore may not be neglected. Moreover, in accordance with the known methods, the introduction of the value for the specific weight of the fuel into the process computer is performed by hand, which leads to a further inaccuracy in counting the fuel mass stream.

SUMMARY OF THE INVENTION

Accordingly, it is an object of the present invention to provide a method of determining and monitoring the fuel mass stream which is supplied for the partial oxidation (gasification) of fine-grain up to pulverized fuel to a gasifier, which avoids the disadvantages of the prior art.

It is also an object of the present invention to provide a method which can simultaneously be used for several fuel streams.

In keeping with these objects and with others which will become apparent hereinafter, one feature of the present invention resides, briefly stated, in a method in accordance with which the fuel mass stream $q_{mk}$ equals $$q_{mk} = (\rho_{tot} \cdot q_{vtot}) - (\rho_{gas} \cdot q_{vgas})$$

determined and for the determination of the individual parameters the following steps are taken in accordance with the present invention:

(a) the total density ($\rho_{tot}$) is determined by the radiometric density measurement of the fuel stream transported with a fluidizing gas in the outlet conduit of the fuel bin;

(b) the total volume stream ($q_{vtot}$) is determined by differential pressure measurement of the fuel stream transported with the fluidizing gas;

(c) the volume stream of the fluidizing gas $q_{vtot}$ is determined in accordance with the following equation:

$$g_{vtot} = (q_{vgas\ supplied} - q_{vgas\ withdrawn}) - q'_{vgas}$$

wherein $q_{vgas\ supplied}$ and $q_{vgas\ discharged}$ are values of the volume stream of the fluidizing gas supplied to the fuel bin and discharged from the fuel bin and determined by differential pressure measurement in respective conduit, and $q'_{vgas}$ is the volume stream for the gas part which is required for filling of the space volume of the fuel quantity discharged from the fuel bin;

(d) the volume stream for the gas part which is required for filling the space volume of the fuel quantity discharged from the fuel bin is determined in accordance with the following equation:

$$q'_{vgas} = q'_{mK} \times \frac{\rho_{gas(b)}}{\rho_K}$$

wherein $\rho_K$ is the density of the introduced fuel, $\rho_{gas\,(b)}$ is the operational density of the fluidizing gas in the fuel bin, and the fuel mass stream $q'_{mK}$ is determined by weighing by means of the pressure pickup of the fuel bin;

(e) the density of the fluidizing gas $\rho_{gas}$ is introduced into the equation as a material-dependent constant.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings.

BRIEF DESCRIPTION OF THE DRAWING

FIG. 2 is a view showing an arrangement for conducting the radiometric density measurements which is especially suitable for use with the inventive method.

DESCRIPTION OF THE PREFERRED EMBODIMENTS

Figure 1:
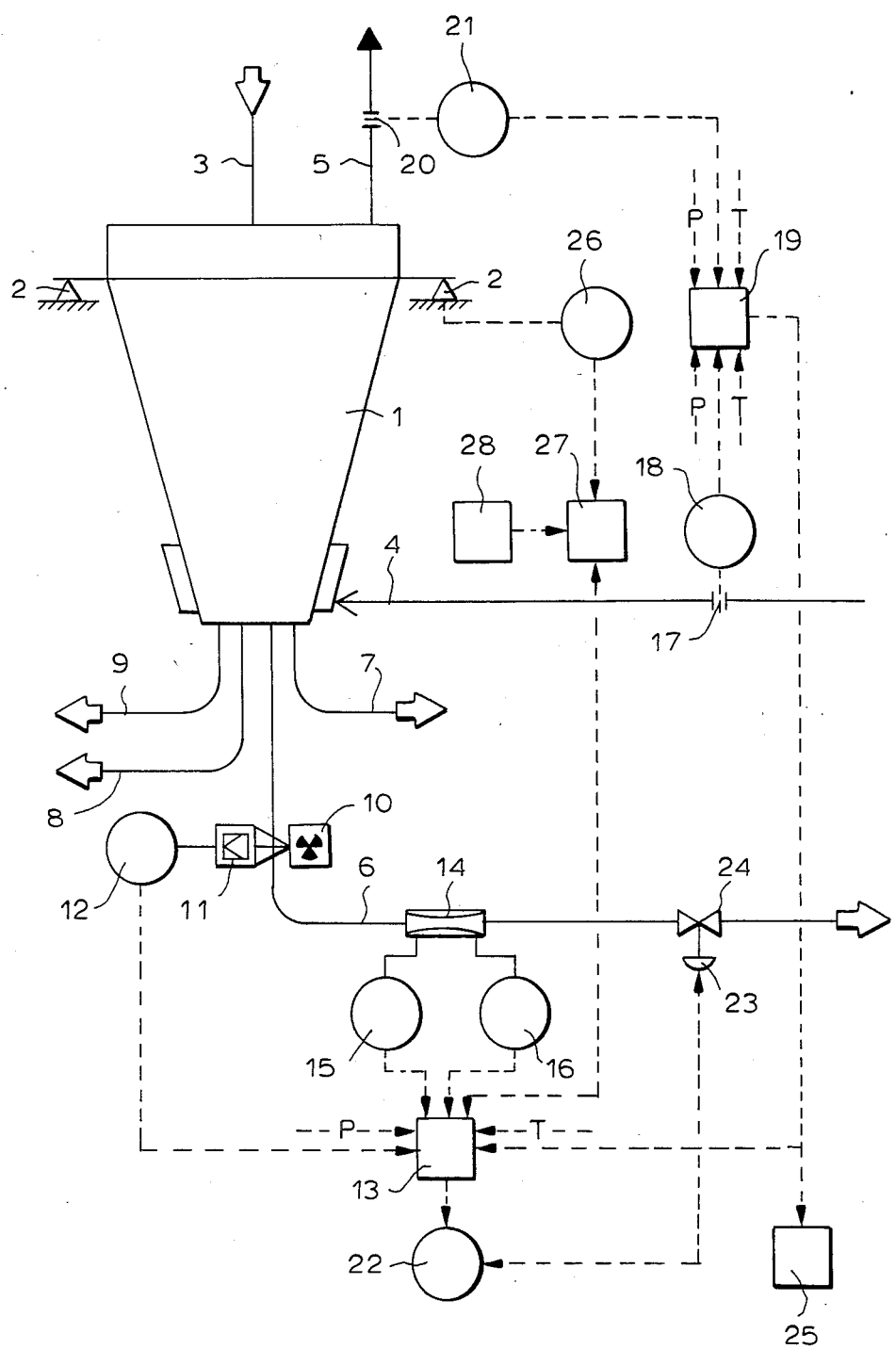
FIG. 1 is a flow diagram of a method in accordance with the present invention.

In the flow diagram of FIG. 1, a fuel bin (supply bin) is identified with reference numeral 1. It is formed as a closed, downwardly conically decreasing bin supported on a pressure cell 2. The fine-grain up to pulverized fuel is supplied via conduit 3 into the supply bin 1. The fluidizing gas which is needed for fluidizing of the fuel is supplied through a conduit 4 into the fuel bin 1. The excessive fluidizing gas is withdrawn via conduit 5 from the fuel bin 1. With the use of the inventive method, as well as the inventive arrangement shown in FIG. 2 and described hereinbelow, from one fuel bin several gasification heads (burners) can be fed. In the shown example, four outlet conduits 6, 7, 8 and 9 extend from the lower conical end of the fuel bin 1 and supply the fuel conveyed with the fluidizing gas to four gasification heads which are not shown in the drawing. For performing the inventive method, the outlet conduit 6 is used for illustration of the same. The inventive method can be implemented also with respect to the other outlet conduits 7, 8, 9.

The fuel located in the outlet conduit 6 and conveyed with the fluidizing gas passes after discharging from the fuel bin 1 through the radiometric density measuring device, which includes a radioactive irradiator 10 at one side of the outlet conduit 6 and a detector 11 at the opposite side of the same. The value for the total density $\rho_{tot}$ determined in an associated measuring value converter 12 is supplied into a process computer 13. After passage of the radiometric density measuring device, the gas-solid mixture travels into a venturi pipe 14 in which it is subjected to a differential pressure measurement. The pressure value determined at the inlet and at the narrowest cross section of the venturi pipe 14 is detected by measuring value converters 15 and 16 and supplied into the process computer 13. In the process computer 13 the value for the total total stream $q_{vtot}$ is determined by differentiation and root extraction.

Simultaneously, the quantity of the fluidizing gas supplied to the fuel bin 1 via the conduit 4 is determined by the differential pressure measurement at a measuring orifice 17, and the determined value can be supplied via the measuring value converter 18 into the process computer 19. The same takes place with the excessive fluidizing gas discharged via the conduit 5 from the fuel bin 1. It is detected at a measuring orifice 20, and the thus obtained value is supplied via a measuring value converter 21 into the process computer 19. In the process computer 19, the supplied values are converted by the additional introduction of the values for the pressure P and the temperature T and linearized by root extraction. Thereby the value of the supplied and discharged fluidizing gas $q_{vgas\,supplied}$ and $q_{vgas\,discharged}$ determined. In accordance with the equation (c) from the difference of both these measuring quantities (supplied gas minus discharged gas), reduced by the gas part $q'_{vgas}$ for filling of the space volume of the discharged fuel quantity, there is then determined the value for the volume stream of the fluidizing gas $q_{vgas}$ in the outlet conduit. The gas part required for filling of the space volume of the discharged fuel quantity is determined in the process computer 27 in accordance with the equation $$q'_{vgas} = q'_{mK} \times \frac{\rho\,gas(b)}{\rho\,K}$$

Here $\rho_K$ is the density of the fuel and $\rho_{gas\,(b)}$ is the operational density of the fluidizing gas.

The value for the fuel mass stream $q'_{mK}$ is determined by weighing with the pressure cells. The fuel discharged from the fuel bin 1 is measured and the measured value is transmitted via the measuring value converter 26 to the process computer 27. The operational density $\rho_{gas\,(b)}$ of the fluidizing gas is its density under the pressure and temperature conditions in the fuel bin 1. It is known that the density of a gas changes with increased pressure and increased temperature as compared to the normal condition $P_0$ and $T_0$. Since a fluidizing gas is normally a gas with an exactly defined density value, for example air, nitrogen or carbon dioxide, its normal density value must be recalculated in the process computer 27 by introduction of the value for the pressure P and the temperature T of the operational conditions which take place in the fuel bin 1, to obtain the desired value for $\rho_{gas\,(b)}$. The data obtained in the individual process computers are transmitted to the process computer 13 which determines the value for the fuel mass stream in accordance with the equation:

$$q_{mK} = (\rho_{tot} \cdot q_{vtot}) - (\rho_{gas} \cdot q_{vgas})$$

The value of the density of the fluidizing gas $\rho_{gas}$ can be introduced from the above mentioned reasons as constant in the computations.

When in some cases only insignificant variations of the loading m (kg fuel per kg gas) take place, the equation for determination of the fuel mass stream in accordance with the present invention can be simplified as follows:

$$q_{mk} = \rho_{tot} q_{vtot} K$$

Here $$K = 1 - \frac{\rho_{gas} \cdot q_{vgas}}{\rho_{tot} \cdot q_{vtot}} = 1 - \frac{1}{1+m}$$

is taken as constant. The constant K takes into account both the geometrical dimensions of the venturi pipe 14, and the factors of the introduced fuel.

The thus determined value for the fuel mass stream $q_{mK}$ is transmitted to a control device 22 which, depending upon a normal value provided thereon, controls an adjusting drive 23 of a control valve 24 in the outlet conduit 6 in the sense that when the nominal value is exceeded the control valve 24 opens more an in the opposite case throttles more. Thereby naturally the fuel supply to the gasifier heads (burners) can be controlled. The gaseous or vaporous reaction media, air or oxygen and/or water vapor, required for the gasification are first supplied behind the control valve 24 into the fuel stream. In addition, the values obtained from the process computers 13 and 19 in a process computer 25 can determine the loading m=kg fuel per kg gas.

The broken lines shown in FIG. 1 identify the impulse conduits through which the individual structural elements of the inventive circuitry are connected with one another in the above discussed manner. It is to be understood that the separate process computers 13, 19, 25 and 27 shown in the flow diagram in practice can be assembled in one central process computer. The process computer 27 is associated with the control device 28 which can interrupt the measuring cycle. This is performed, first of all when for controlling purposes, a predetermined, exactly defined fuel quantity must be discharged from the fuel bin 1. This nominal control quality is introduced into the control device 28 and the latter automatically interrupts the measuring cycle as long as the discharge of the nominal control quantity from the fuel bin 1 has been completed.

As mentioned hereinabove, the inventive can also be used for the fuel bin with several outlet openings, for example four, in which the fine-grain up to pulverized fuel can be supplied to the respective gasification heads and whose determination and monitoring of the fuel mass stream can be conducted simultaneously.

FIG. 2 shows a cross section of an arrangement with the aid of which the radiometric density measurements can be performed simultaneously in all four openings 6, 7, 8, 9. The radioactive irradiator 10, for example strontium-90, is here arranged centrally in a radiation-protective container 29 which is provided with four irradiation passages 30. The radiation passages 30 are arranged so that a radioactive ray extending through a radiation-permeable window 31 penetrates a measuring product located in the oppositely arranged outlet passages 6, 7, 8 and 9. At the other side of the outlet passages 6, 7, 8, 9, a detector 11 with an amplifier 32 is arranged so as to measure the radioactive ray penetrated through the outlet passages 6, 7, 8 and 9. The detectors 11 are connected by conductors 33 with an associated measuring value converter which is not shown in the drawing. Shutters 34 can be arranged between the radiation protecting container 29 and the outlet conduits 6, 7, 8, 9 in the course of rays for calibration of the measuring device. It is a metal sheet with exactly defined density and thickness with which the initial and the final value of the sensitivity range of the measuring device can be determined. It is to be understood that the above described device can be modified so that instead of four ray passages 30 more or fewer passages can be provided, so as to make possible the simultaneous radiometric density measurement in a respectively changed number of the outlet conduits.

It should be mentioned that the inventive method is not dependent upon the utilization of predetermined process conditions in the partial oxidation. It can be performed in different conditions, for example in the sense of pressure, temperature, reaction media, etc. Also, the inventive method can also be used where charging of a fuel in a reaction chamber with similar conditions as in the case of partial oxidation. For example, it can be used for receding coal preheating in a coking plant, the coal injection in blast furnaces and melting furnaces, and also the coal dust conveyance for firing devices and revolving tubular furnaces.

It will be understood that each of the elements described above, or two or more together, may also find a useful application in other types of constructions differing from the types described above.

While the invention has been illustrated and described as embodied in a method for determining and monitoring the fuel mass stream, it is not intended to be limited to the detail shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims.

1. A method of determination and monitoring of a fuel mass stream supplied for partial oxidation of fine-grain up to pulverized fuel to a gasifier, with the utilization of a radiometric density measurement of the fine-grain up to pulverized fuel conveyed by a gaseous medium and a volume stream measurement, the method comprising the steps of determining a total density $\rho_{tot}$ of a fuel stream conveyed by a fluidizing gas in an outlet conduit of a fuel bin with the aid of a radiometric density measurement; subsequently determining a total volume stream $q_{vtot}$ of said stream by a differential pressure measurement; determining a difference between volume streams of a fluidizing gas supplied to the fuel bin $q_{vgas\ supplied}$ and discharged from the latter $q_{vgas\ discharged}$ by differential pressure measurements; determining a volume stream of the fluiding gas $q_{vgas}$ by deducting from said difference a volume stream of a gas part $q'_{vgas}$ required for filling of a space volume of a discharge fuel from the fuel bin in accordance with the following equation:

$$q_{vgas} = (q_{vgas\ supplied} - q_{vgas\ discharged}) - q'_{vgas};$$

determining the volume stream of the gas part $q'_{vgas}$ in accordance with the following equation:

$$q'_{vgas} = q'_{mK} \times \frac{\rho_{gas(b)}}{\rho_K}$$

wherein $\rho_K$ is the density of the fuel, $\rho_{gas(b)}$ is operational density of the fluidizing gas at a pressure and temperature in the fuel bin, and $q'_{mk}$ is the fuel volume stream determined by weighing in the fuel bin; and determining from a density of the fluidizing gas $\rho_{gas}$ as a material-dependent constant and from the thus obtained values the fuel mass stream $q_{mK}$ in accordance with the following equation:

$$q_{mK} = (\rho_{tot} \cdot q_{vtot}) - (\rho_{gas} \cdot q_{vgas}).$$

2. A method as defined in claim 1, wherein said step of determining the total volume stream $q_{vtot}$ by the differential pressure measurement includes determining in a venturi tube.

3. A method as defined in claim 1, and further comprising the step of transmitting the determined value of the fuel total mass stream $q_{mK}$ to a control device, and controlling by the control device via a control valve a fuel supply to a gasifier.

* * * * *